United States Patent
Kim et al.

(10) Patent No.: US 10,941,290 B2
(45) Date of Patent: Mar. 9, 2021

(54) POLYCARBONATE RESIN COMPOSITION AND MOLDED PRODUCT USING THE SAME

(71) Applicant: Lotte Advanced Materials Co., Ltd., Yeosu-si (KR)

(72) Inventors: Kyoungju Kim, Uiwang-si (KR); In-Chol Kim, Uiwang-si (KR); Keehae Kwon, Uiwang-si (KR); Jungeun Park, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 33 days.

(21) Appl. No.: 16/233,725

(22) Filed: Dec. 27, 2018

(65) Prior Publication Data

US 2019/0203036 A1   Jul. 4, 2019

(30) Foreign Application Priority Data

Dec. 29, 2017 (KR) .......................... 10-2017-0184923
Nov. 14, 2018 (KR) .......................... 10-2018-0140085

(51) Int. Cl.
| | |
|---|---|
| *C08L 69/00* | (2006.01) |
| *C08L 33/12* | (2006.01) |
| *C08L 55/02* | (2006.01) |
| *C08L 25/12* | (2006.01) |
| *C08F 220/18* | (2006.01) |
| *C08L 51/04* | (2006.01) |

(52) U.S. Cl.
CPC ............ *C08L 55/02* (2013.01); *C08F 220/18* (2013.01); *C08L 25/12* (2013.01); *C08L 33/12* (2013.01); *C08L 51/04* (2013.01); *C08L 69/00* (2013.01); *C08F 220/1804* (2020.02); *C08F 2500/01* (2013.01); *C08L 2205/025* (2013.01); *C08L 2205/03* (2013.01); *C08L 2205/035* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 6,423,767 B1 * | 7/2002 | Weber | C08K 5/092 524/158 |
| 7,563,846 B2 | 7/2009 | Chen et al. | |
| 9,505,930 B2 | 11/2016 | Sun et al. | |
| 9,771,476 B2 | 9/2017 | Kim et al. | |
| 2016/0185959 A1 * | 6/2016 | Kim | C08L 69/00 525/67 |
| 2016/0312026 A1 * | 10/2016 | Kim | C08L 69/00 |

FOREIGN PATENT DOCUMENTS

| | | |
|---|---|---|
| JP | 5644363 A | 5/2012 |
| KR | 10-0149247 B1 | 10/1998 |
| KR | 10-0245948 B1 | 3/2000 |
| KR | 10-2008-0025032 A | 3/2008 |
| KR | 10-2014-0037629 A | 3/2014 |
| KR | 10-2016-0127262 A | 11/2016 |
| KR | 10-2016-0144944 A | 12/2016 |
| WO | 2007-008450 A1 | 1/2007 |

OTHER PUBLICATIONS

Webpage "Blendex BMAT" (http://www.worldofchemicals.com/chemicals/chemical-properties/blendex-bmat.html), downloaded on Dec. 11, 2018, pp. 1-2.

* cited by examiner

*Primary Examiner* — David J Buttner
(74) *Attorney, Agent, or Firm* — Additon, Higgins & Pendleton, P.A.

(57) ABSTRACT

Disclosed are a thermoplastic resin composition including about 100 parts by weight of a base resin including (A-1) about 50 wt % to about 70 wt % of a polycarbonate resin and (A-2) about 30 wt % to about 50 wt % of a rubber modified vinyl-based copolymer, (B) about 1 to about 3 parts by weight of a cross-linkable styrene-acrylonitrile copolymer; and (C) about 1 to about 3 parts by weight of a methyl methacrylate-butyl acrylate copolymer, and a molded article using the same.

9 Claims, 2 Drawing Sheets

POLYCARBONATE RESIN COMPOSITION AND MOLDED PRODUCT USING THE SAME

CROSS-REFERENCE TO RELATED APPLICATION

This application claims priority to and the benefit of Korean Patent Application Nos. 10-2017-0184923 and 10-2018-0140085 filed in the Korean Intellectual Property Office on Dec. 29, 2017 and Nov. 14, 2018, respectively, the entire disclosure of each of which is incorporated herein by reference.

FIELD

A thermoplastic resin composition and a molded article using the same are disclosed.

BACKGROUND

A polycarbonate resin is widely used as one of engineering plastics in a plastic industry.

Polycarbonate resin has a glass transition temperature (Tg) reaching about 150° C. due to a bulky molecular structure such as derived from bisphenol-A and thus can have high heat resistance. Polycarbonate resin can also have flexibility and rigidity given by a carbonyl group of a carbonate group having high rotating mobility. In addition, the polycarbonate resin is an amorphous polymer and thus can have excellent transparency characteristics.

Polycarbonate resin further can have excellent impact resistance and compatibility with other resins and the like.

Polycarbonate resin, however, can exhibit a defect of deteriorated fluidity and thus, may also be largely used as alloys with various resins in order to complement workability and post processibility.

Among the alloys, a polycarbonate/acrylonitrile-butadiene-styrene copolymer (PC/ABS) alloy can have excellent durability, formability, heat resistance, impact resistance, and the like and is applied to many fields such as electric/electronic products, vehicles, building materials, miscellaneous real-life materials, and the like.

Recently, a material having relatively low gloss characteristics has been required in order to realize a luxurious feeling depending on a part to which a material is applied. However, PC/ABS alloys generally exhibit high gloss. As a method for lowering the gloss characteristics, a method of increasing a size of a rubbery polymer particle or applying a quencher has been attempted, but uniformity of appearance may be lowered.

Accordingly, there is a need for a thermoplastic resin composition capable of maintaining low gloss characteristics and uniform external appearance while maintaining excellent durability, formability, heat resistance, and impact resistance as compared with conventional PC/ABS alloys.

SUMMARY OF THE INVENTION

A thermoplastic resin composition that can have improved impact resistance and/or appearance uniformity and/or low gloss characteristics and a molded article using the same are provided.

The thermoplastic resin composition includes: about 100 parts by weight of a base resin (A) including (A-1) about 50 wt % to about 70 wt % of a polycarbonate resin and (A-2) about 30 wt % to about 50 wt % of a rubber modified vinyl-based copolymer, (B) about 1 to about 3 parts by weight of a cross-linked styrene-acrylonitrile copolymer; and (C) about 1 to about 3 parts by weight of a methyl methacrylate-butyl acrylate copolymer.

The rubber modified vinyl-based copolymer (A-2) may include (A-2-1) an acrylonitrile-butadiene-styrene graft copolymer including a butadiene-based rubbery polymer having an average particle diameter of about 200 nm to about 400 nm and (A-2-2) an acrylonitrile-butadiene-styrene copolymer including a butadiene-based rubbery polymer having an average particle diameter of about 400 nm to about 1,000 nm.

The acrylonitrile-butadiene-styrene graft copolymer (A-2-1) may include a core of the butadiene-based rubbery polymer and a shell formed by graft-polymerization of a styrene-acrylonitrile copolymer on the core.

The core may be included in an amount of about 40 wt % to about 50 wt % based on 100 wt % of the acrylonitrile-butadiene-styrene graft copolymer (A-2-1).

The acrylonitrile-butadiene-styrene copolymer (A-2-2) may include a dispersion phase having a core-shell structure including a core of the butadiene-based rubbery polymer and a shell formed by graft-polymerization of a styrene-acrylonitrile copolymer on the core, and a continuous phase of a styrene-acrylonitrile copolymer.

The core may be included in an amount of about 10 wt % to about 15 wt % based on 100 wt % of the acrylonitrile-butadiene-styrene copolymer (A-2-2).

The cross-linked styrene-acrylonitrile copolymer (B) may have a weight average molecular weight of about 1,000,000 g/mol to about 10,000,000 g/mol.

The methyl methacrylate-butyl acrylate copolymer (C) may be a copolymer of a monomer mixture including about 60 wt % to about 90 wt % of methyl methacrylate and about 10 wt % to about 40 wt % of butyl acrylate.

A molded article made using the thermoplastic resin composition according to an embodiment is also provided.

The thermoplastic resin composition according to an embodiment and a molded article made using the same can have excellent impact resistance and/or appearance uniformity and/or low gloss characteristics. The thermoplastic resin composition may be used to make a wide variety of molded products, painted and/or not painted, for example, an auto interior material and the like.

BRIEF DESCRIPTION OF THE DRAWINGS

FIG. 1 is an image of a specimen having "good" appearance uniformity and FIG. 2 is an image of a specimen having "inferior" appearance uniformity.

DETAILED DESCRIPTION

Figure 1:
FIGS. 1 and 2 show appearance evaluation references of specimens of molded articles manufactured using thermoplastic resin compositions according to embodiments.

The above and other aspects, features, and advantages of the present invention will become apparent from the detailed description of the following embodiments in conjunction with the accompanying drawings. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

In the present disclosure, unless otherwise described, the average particle diameter refers to a volume average diameter, and refers to a Z-average particle diameter measured using a dynamic light scattering analyzer.

In the present disclosure, the weight average molecular weight is obtained by dissolving a powdery sample into tetrahydrofuran (THF) and then measuring the same using a gel permeation chromatography (GPO; Agilent Technologies 1200 series, column is Shodex LF-804 (8.0.1.D.×300 mm), and standard sample is polystyrene (manufactured by Shodex)).

According to an embodiment, a thermoplastic resin composition includes about 100 parts by weight of a base resin (A) including (A-1) about 50 wt % to about 70 wt % of a polycarbonate resin and (A-2) about 30 wt % to about 50 wt % of a rubber modified vinyl-based copolymer, (B) about 1 to about 3 parts by weight of a cross-linked styrene-acrylonitrile copolymer; and (C) about 1 to about 3 parts by weight of a methyl methacrylate-butyl acrylate copolymer.

Hereinafter, each component of the thermoplastic resin composition is described in detail.

(A) Base Resin (A-1) Polycarbonate Resin

The polycarbonate resin is not particularly limited and may be any polycarbonate that is usable in a field of a resin composition.

For example, the polycarbonate resin may be prepared by reacting a diphenol(s) represented by Chemical Formula 1 with phosgene, halogenic acid ester, carbonate ester, or a combination thereof:

[Chemical Formula 1]

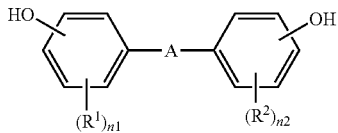

wherein in Chemical Formula 1,

A is a linking group selected from a single bond, a substituted or unsubstituted C1 to C30 alkylene group, a substituted or unsubstituted C2 to C5 alkenylene group, a substituted or unsubstituted C2 to C5 alkylidene group, a substituted or unsubstituted C1 to C30 haloalkylene group, a substituted or unsubstituted C5 to C6 cycloalkylene group, a substituted or unsubstituted C5 to C6 cycloalkenylene group, a substituted or unsubstituted C5 to C10 cycloalkylidene group, a substituted or unsubstituted C6 to C30 arylene group, a substituted or unsubstituted C1 to C20 alkoxylene group, a halogenic acid ester group, a carbonate ester group, CO, S, and $SO_2$, $R^1$ and $R^2$ are the same or different and are each independently a substituted or unsubstituted C1 to C30 alkyl group or a substituted or unsubstituted C6 to C30 aryl group, and n1 and n2 are the same or different and are each independently an integer ranging from 0 to 4.

Two or more kinds of the diphenols represented by Chemical Formula 1 may be combined to constitute a repeating unit of a polycarbonate resin.

Examples of the diphenols may include without limitation hydroquinone, resorcinol, 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like, and combinations thereof. Among the diphenols, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, and/or 1,1-bis(4-hydroxyphenyl)cyclohexane may be used, for example, 2,2-bis(4-hydroxyphenyl)propane may be used.

The polycarbonate resin may be a mixture of copolymers obtained using two or more diphenols that differ from each other.

In addition, the polycarbonate resin may be a linear polycarbonate resin, a branched polycarbonate resin, and/or a polyestercarbonate copolymer resin, and the like.

Examples of the linear polycarbonate resin may include without limitation a bisphenol-A polycarbonate resin. Examples of the branched polycarbonate resin may include without limitation a polymer prepared by reacting a multifunctional aromatic compound such as trimellitic anhydride, trimellitic acid, and the like, with a diphenol(s) and a carbonate. The polyester carbonate copolymer resin may be prepared by reacting bifunctional carboxylic acid with a diphenol(s) and carbonate, wherein the carbonate can be, for example, diaryl carbonate such as diphenyl carbonate and/or ethylene carbonate.

The base resin can include the polycarbonate resin in an amount of about 50 wt % to about 70 wt %, for example about 55 wt % to about 70 wt %, and as another example about 60 wt % to about 70 wt %, based on 100 wt % of the base resin. In some embodiments, the base resin can include the polycarbonate resin in an amount of about 50, 51, 52, 53, 54, 55, 56, 57, 58, 59, 60, 61, 62, 63, 64, 65, 66, 67, 68, 69, or 70 wt % based on 100 wt % of the base resin. Further, according to some embodiments, the amount of the polycarbonate resin may be in a range from about any of the foregoing amounts to about any other of the foregoing amounts.

When the amount of the polycarbonate resin is less than about 50 wt %, appearance characteristics may be not good while when it is greater than about 70 wt %, mechanical strength may be lowered.

The polycarbonate resin may have a weight average molecular weight of about 10,000 g/mol to about 200,000 g/mol, for example, about 14,000 g/mol to about 40,000 g/mol. When the polycarbonate resin has a weight average molecular weight within the above ranges, excellent impact resistance and/or fluidity may be obtained. In addition, two different kinds of the polycarbonate resin having different weight average molecular weights and/or different flow index may be mixed and used in order to satisfy desirable fluidity.

(A-2) Rubber Modified Vinyl-based Copolymer

The rubber modified vinyl-based copolymer according to an embodiment may include a butadiene-based rubbery polymer and a vinyl-based copolymer.

Examples of the butadiene-based rubbery polymer may include without limitation a polybutadiene rubber, a butadiene-styrene copolymer rubber, a butadiene-acrylonitrile copolymer rubber, and the like, and combinations thereof.

The vinyl-based copolymer may include an aromatic vinyl monomer and may further include a monomer copolymerizable with the aromatic vinyl monomer. Examples of the aromatic vinyl monomer may include without limitation styrene, C1 to C10 alkyl-substituted styrene, halogen-substituted styrene, and the like, and combinations thereof. Examples of the alkyl-substituted styrene may include without limitation o-ethyl styrene, m-ethyl styrene, p-ethyl styrene, α-methyl styrene, and the like, and combinations thereof.

Examples of the monomer copolymerizable with the aromatic vinyl monomer may include without limitation a vinyl cyanide monomer, an acryl-based monomer, a heterocyclic monomer, and the like, and combinations thereof.

Examples of the vinyl cyanide monomer may include without limitation acrylonitrile, methacrylonitrile, fumaronitrile, and the like, and combinations thereof.

Examples of the acryl-based monomer may include without limitation (meth)acrylic acid alkyl esters, (meth)acrylic acid esters, and the like, and combinations thereof. Herein, the alkyl may refer to C1 to C10 alkyl. Examples of the (meth)acrylic acid alkyl ester may include without limitation methyl(meth)acrylate, ethyl(meth)acrylate, propyl(meth)acrylate, butyl(meth)acrylate, and the like, and combinations thereof.

The base resin can include the rubber modified vinyl-based copolymer in an amount of about 30 wt % to about 50 wt %, for example about 30 wt % to about 45 wt %, and as another example about 30 wt % to about 40 wt %, based on 100 wt % of the base resin. In some embodiments, the base resin may include rubber modified vinyl-based copolymer in an amount of about 30, 31, 32, 33, 34, 35, 36, 37, 38, 39, 40, 41, 42, 43, 44, 45, 46, 47, 48, 49, or 50 wt % based on 100 wt % of the base resin. Further, according to some embodiments, the amount of the rubber modified vinyl-based copolymer may be in a range from about any of the foregoing amounts to about any other of the foregoing amounts.

The heterocyclic monomer can include without limitation maleic anhydride, alkyl or phenyl N-substituted maleimide, and the like, and combinations thereof. When the amount of the rubber modified vinyl-based copolymer is less than about 30 wt % in the base resin, impact resistance of the thermoplastic resin composition may be decreased while when it is greater than 50 wt %, heat resistance may be decreased.

Examples of the rubber modified vinyl-based copolymer may include without limitation an acrylonitrile-butadiene-styrene graft copolymer (A-2-1) having a core-shell structure including a core of the butadiene-based rubbery polymer and a shell formed by graft-polymerization of a styrene-acrylonitrile copolymer on the core.

Another example of the rubber modified vinyl-based copolymer may include without limitation an acrylonitrile-butadiene-styrene copolymer (A-2-2) including a dispersion phase having a core-shell structure including a core of the butadiene-based rubbery polymer and a shell formed by graft-polymerization of a styrene-acrylonitrile copolymer on the core, and a continuous phase of a styrene-acrylonitrile copolymer.

The rubber modified vinyl-based copolymer may include the acrylonitrile-butadiene-styrene graft copolymer (A-2-1), the acrylonitrile-butadiene-styrene copolymer (A-2-2), and/or a combination thereof. In some embodiments, the rubber modified vinyl-based copolymer may include the acrylonitrile-butadiene-styrene graft copolymer (A-2-1) and/or the acrylonitrile-butadiene-styrene copolymer (A-2-2) and/or another rubber modified vinyl-based copolymer that is not the same as the acrylonitrile-butadiene-styrene graft copolymer (A-2-1) and/or the acrylonitrile-butadiene-styrene copolymer (A-2-2).

The acrylonitrile-butadiene-styrene graft copolymer (A-2-1) and the acrylonitrile-butadiene-styrene copolymer (A-2-2) may have a core-shell structure as described above. The butadiene-based rubbery polymer component of the core may particularly improve impact strength at a low temperature and the shell component may lower interface tensile strength, may decrease the rubbery polymer particle size of the dispersion phase, and/or may improve adherence on the interface.

The acrylonitrile-butadiene-styrene graft copolymer (A-2-1) and the acrylonitrile-butadiene-styrene copolymer (A-2-2) included in the rubber modified vinyl-based copolymer can differ with respect to the average particle diameters of the butadiene-based rubbery polymer and/or formation method of the shell.

For example, the acrylonitrile-butadiene-styrene graft copolymer (A-2-1) may be prepared by adding styrene and acrylonitrile to the butadiene-based rubbery polymer and graft-copolymerizing them through a general polymerization method such as emulsion polymerization, massive polymerization, and the like. That is, the acrylonitrile-butadiene-styrene graft copolymer (A-2-1) may include a graft copolymer having a core-shell structure including a core of a butadiene-based rubbery polymer and a shell formed by graft-polymerization of a styrene-acrylonitrile copolymer on the core.

The butadiene-based rubbery polymer of the acrylonitrile-butadiene-styrene graft copolymer (A-2-1) can have an average particle diameter of about 200 nm to about 400 nm, for example about 200 nm to about 350 nm, and as another example about 250 nm to about 350 nm.

The base resin can include the acrylonitrile-butadiene-styrene graft copolymer (A-2-1) in an amount of about 3 wt % to about 20 wt %, for example about 5 wt % to about 20 wt %, and as another example about 5 wt % to about 15 wt %, based on 100 wt % of the base resin. In some embodiments, the base resin may include the acrylonitrile-butadiene-styrene graft copolymer (A-2-1) in an amount of about 3, 4, 5, 6, 7, 8, 9, 10, 11, 12, 13, 14, 15, 16, 17, 18, 19, or 20 wt %, based on 100 wt % of the base resin. Further, according to some embodiments, the amount of the acrylonitrile-butadiene-styrene graft copolymer (A-2-1) may be in a range from about any of the foregoing amounts to about any other of the foregoing amounts.

The acrylonitrile-butadiene-styrene graft copolymer (A-2-1) can include the butadiene-based rubbery polymer in an amount of about 40 wt % to about 50 wt % based on 100 wt % of the acrylonitrile-butadiene-styrene graft copolymer (A-2-1). In some embodiments, the acrylonitrile-butadiene-styrene graft copolymer (A-2-1) can include the butadiene-based rubbery polymer in an amount of about 40, 41, 42, 43, 44, 45, 46, 47, 48, 49, or 50 wt % based on 100 wt % of the acrylonitrile-butadiene-styrene graft copolymer (A-2-1). Further, according to some embodiments, the amount of the butadiene-based rubbery polymer may be in a range from about any of the foregoing amounts to about any other of the foregoing amounts.

The shell of the acrylonitrile-butadiene-styrene graft copolymer (A-2-1) may be formed by copolymerization of the styrene and acrylonitrile in a weight ratio of about 8:2 to about 6:4.

When the acrylonitrile-butadiene-styrene graft copolymer (A-2-1) is added in an amount of less than about 3 wt % to the base resin, impact resistance of the thermoplastic resin composition may be decreased, while when it is included in an amount of greater than about 20 wt %, heat resistance may be decreased.

The acrylonitrile-butadiene-styrene copolymer (A-2-2) may include a dispersion phase having a core-shell structure including a core of the butadiene-based rubbery polymer and a shell formed by graft-polymerization of a styrene-acrylonitrile copolymer on the core, and a continuous phase of a styrene-acrylonitrile copolymer.

The butadiene-based rubbery polymer of the acrylonitrile-butadiene styrene copolymer (A-2-2) can have an average particle diameter of, for example, about 400 nm to about 1,000 nm, as another example about 400 nm to about 900 nm, as another example about 400 nm to about 800 nm, as another example about 400 nm to about 700 nm, as another example about 450 nm to about 700 nm, and as another example about 500 nm to about 700 nm.

The average particle diameter of the butadiene-based rubbery polymer of the acrylonitrile-butadiene styrene copolymer (A-2-2) can be different from the average particle diameter of the butadiene-based rubbery polymer of the acrylonitrile-butadiene styrene copolymer (A-2-1).

The base resin can include the acrylonitrile-butadiene-styrene copolymer (A-2-2) in an amount of about 10 wt % to about 30 wt %, for example about 15 wt % to about 30 wt %, and as another example about 20 wt % to about 30 wt %, based on 100 wt % of the base resin. In some embodiments, the base resin may include the acrylonitrile-butadiene-styrene copolymer (A-2-2) in an amount of about 10, 11, 12, 13, 14, 15, 16, 17, 18, 19, 20, 21, 22, 23, 24, 25, 26, 27, 28, 29, or 30 wt %, based on 100 wt % of the base resin. Further, according to some embodiments, the amount of the acrylonitrile-butadiene-styrene copolymer (A-2-2) may be in a range from about any of the foregoing amounts to about any other of the foregoing amounts.

The acrylonitrile-butadiene-styrene copolymer (A-2-2) can include the butadiene-based rubbery polymer in an amount of about 10 wt % to about 15 wt % based on 100 wt % of the acrylonitrile-butadiene-styrene copolymer (A-2-2). In some embodiments, the acrylonitrile-butadiene-styrene copolymer (A-2-2) can include the butadiene-based rubbery polymer in an amount of about 10, 11, 12, 13, 14, or 15 wt % based on 100 wt % of the acrylonitrile-butadiene-styrene copolymer (A-2-2). Further, according to some embodiments, the amount of the butadiene-based rubbery polymer may be in a range from about any of the foregoing amounts to about any other of the foregoing amounts.

A weight average molecular weight of the styrene-acrylonitrile copolymer of the continuous phase may be, for example about 150,000 g/mol to about 250,000 g/mol, and as another example about 170,000 g/mol to about 230,000 g/mol.

When the acrylonitrile-butadiene-styrene copolymer (A-2-2) is included in an amount of less than 10 wt % relative to the base resin, impact resistance of the thermoplastic resin composition may be decreased and/or quenching effects of an molded article may be deteriorated during manufacturing a molded article with the thermoplastic resin composition, while when it is included in an amount of greater than about 30 wt %, heat resistance may be decreased.

(B) Cross-Linked Styrene-Acrylonitrile Copolymer

The cross-linked styrene-acrylonitrile copolymer may be a material wherein the styrene-acrylonitrile copolymer forms a cross-linking bond to provide an ultrahigh molecular weight. The cross-linked styrene-acrylonitrile copolymer may improve compatibility between the polycarbonate resin and the rubber modified vinyl-based copolymer and simultaneously, may provide the surface of the molded article with surface roughness to improve a quenching effect of the molded article during manufacturing a molded article with the thermoplastic resin composition. Accordingly, a thermoplastic resin composition having excellent extrusion formability and a molded article having improved low gloss characteristics made of the thermoplastic resin composition may be provided.

The cross-linked styrene-acrylonitrile copolymer may have a weight average molecular weight of, for example, about 1,000,000 g/mol to about 10,000,000 g/mol, as another example about 2,000,000 g/mol to about 8,000,000 g/mol, as another example about 3,000,000 g/mol to about 7,000,000 g/mol, as another example about 3,000,000 g/mol to about 10,000,000 g/mol, and as another example about 4,000,000 g/mol to about 6,000,000 g/mol. When the weight average molecular weight of the cross-linked styrene-acrylonitrile copolymer is outside of the above ranges, compatibility between the polycarbonate resin and the rubber modified vinyl-based copolymer may be decreased and thus extrusion formability may be deteriorated.

The thermoplastic resin composition can include the cross-linked styrene-acrylonitrile copolymer in an amount of about 1 to about 3 parts by weight, for example about 1 to about 2 parts by weight, based on about 100 parts by weight of the base resin. In some embodiments, the thermoplastic resin composition can include the cross-linked styrene-acrylonitrile copolymer in an amount of about 1, 2, or 3 parts by weight, based on about 100 parts by weight of the base resin. Further, according to some embodiments, the amount of the cross-linked styrene-acrylonitrile copolymer may be in a range from about any of the foregoing amounts to about any other of the foregoing amounts.

When the amount of the cross-linked styrene-acrylonitrile copolymer is within the above ranges, compatibility between the polycarbonate resin and the rubber modified vinyl-based copolymer may be improved and thus extrusion formability of the thermoplastic resin according to an embodiment may be improved.

(C) Methyl Methacrylate-Butyl Acrylate Copolymer

The methyl methacrylate-butyl acrylate copolymer improves compatibility between the components of the thermoplastic resin composition, and thereby, the molded article may have an uniform appearance during manufacturing a molded article with the thermoplastic resin composition.

The methyl methacrylate-butyl acrylate copolymer may be a copolymer including a monomer mixture including about 60 wt % to about 90 wt % of the methyl methacrylate and about 10 wt % to about 40 wt % of the butyl acrylate.

In some embodiments, the monomer mixture can include the methyl methacrylate in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on 100 wt % of the monomer mixture. Further, according to some embodiments, the amount of the methyl methacrylate may be in a range from about any of the foregoing amounts to about any other of the foregoing amounts.

In some embodiments, the monomer mixture can include the butyl acrylate in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt % based on 100 wt % of the monomer mixture. Further, according to some embodiments, the amount of the butyl acrylate may be in a range from about any of the foregoing amounts to about any other of the foregoing amounts.

When the methyl methacrylate and the butyl acrylate monomer components of the methyl methacrylate-butyl acrylate copolymer are present in amounts within the above ranges, compatibility between the polycarbonate resin and the rubber modified vinyl-based copolymer may be improved.

The methyl methacrylate-butyl acrylate copolymer may have a weight average molecular weight of about 1,000,000 to about 5,000,000 g/mol, for example about 1,200,000 to about 4,000,000 g/mol, and as another example about 1,500,000 to about 3,000,000 g/mol. When the weight average molecular weight of the methyl methacrylate-butyl acrylate copolymer is within the above ranges, morphologies between the composition components can become stable with minimal or no deterioration of the fluidity of the resin composition in a shear rate region at the time of injection molding.

The thermoplastic resin composition can include the methyl methacrylate-butyl acrylate copolymer in an amount of about 1 to about 3 parts by weight, for example about 1 to about 2 parts by weight based on about 100 parts by weight of the base resin. In some embodiments, the thermoplastic resin composition can include the methyl methacrylate-butyl acrylate copolymer in an amount of about 1, 2, or 3 parts by weight, based on about 100 parts by weight of the base resin. Further, according to some embodiments, the amount of the methyl methacrylate-butyl acrylate copolymer may be in a range from about any of the foregoing amounts to about any other of the foregoing amounts.

When the amount of the methyl methacrylate-butyl acrylate copolymer is less than 1 part by weight, compatibility between the polycarbonate resin and the rubber modified vinyl-based copolymer may be lowered, while when it is greater than 3 parts by weight, the resin composition can have a low fluidity and can be difficult to process.

(D) Other Additives

The thermoplastic resin composition may further include one or more than one additives optionally in accordance with its use. Examples of the additives may include without limitation flame retardants, lubricants, plasticizers, heat stabilizers, antioxidants, light stabilizers, and/or colorants and two or more kinds may be mixed in accordance with characteristics of final molded articles.

The flame retardant is a material for reducing flammability. Examples of the flame retardant can include phosphate compounds, phosphite compounds, phosphonate compounds, polysiloxanes, phosphazene compounds, phosphinate compounds, and/or melamine compounds, but is not limited thereto.

The lubricant plays a role of smoothening the surface of a metal contacting the thermoplastic resin composition during the process/molding/extrusion and thus helping a flow or movement of the thermoplastic resin composition.

The plasticizer may be generally used to increase flexibility, process workability, and/or expansion property of the thermoplastic resin composition and may be any generally-used materials.

The heat stabilizer may suppress a thermal decomposition of the thermoplastic resin composition when kneaded or molded at a high temperature and may be any generally-used materials.

The antioxidant may suppress or block a chemical reaction of the thermoplastic resin composition with oxygen and thus prevent decomposition of the thermoplastic resin composition and loss of its inherent properties. Examples of the antioxidant can include phenol-type, phosphate-type, thioether-type, and/or amine-type antioxidants, but is not limited thereto.

The light stabilizer suppresses or blocks decomposition of the thermoplastic resin composition from ultraviolet (UV) and thus its color change or mechanical property loss. Examples of the light stabilizer can include hindered phenol-type, benzophenone-type, and/or benzotriazole-type light stabilizers, but is not limited thereto.

The colorant may include a general pigment and/or dye.

The additives may be included in an amount of about 0.1 parts by weight to 15 parts by weight based on about 100 parts by weight of the base resin.

The thermoplastic resin composition according to the present disclosure may be prepared in a well-known method of preparing a thermoplastic resin composition.

For example, the thermoplastic resin composition according to the present disclosure may be manufactured into a pellet by mixing components and other optional additives simultaneously and melt-kneading the same in an extruder.

A molded article according to an embodiment of the present disclosure can have a notched Izod impact strength of about 50 kgf·cm/cm to about 70 kgf·cm/cm, for example about 50 kgf·cm/cm to about 65 kgf·cm/cm, for example about 55 kgf·cm/cm to about 65 kgf·cm/cm, for example about 55 kgf·cm/cm to about 60 kgf·cm/cm, as measured on a ⅛" thick specimen in accordance with ASTM D256.

The molded article according to an embodiment of the present disclosure can have a surface gloss of 10 GU to 35 GU, for example 10 GU to 30 GU, for example 15 GU to 30 GU, for example 20 GU to 30 GU, for example 20 GU to 25 GU, measured at a reflection angle of 60° on a specimen injection molded at a molding temperature of about 260° C. and a mold temperature of about 60° C. in a 6 oz. injection molding machine using a gloss meter.

The molded article according to an embodiment of the present disclosure can have an appearance uniformity with no flow marks observed by evaluation by the naked eye of a specimen having a width×length×thickness of 140 mm×200 mm×2.6 mm prepared by injection molding at a molding temperature of about 260° C. and a mold temperature of about 60° C. in a 6 oz. injection molding machine.

The molded article according to an embodiment of the present disclosure may be manufactured from the thermoplastic resin composition. The thermoplastic resin composition can have excellent low gloss, appearance uniformity, and/or impact resistance and/or also excellent formability and thus may be used in the manufacture of a molded article requiring one or more than one of these properties. As a non-limiting example, the thermoplastic resin composition of the present disclosure can be used in the manufacture of an auto interior material to realize high-quality appearance due to low gloss characteristics.

Hereinafter, the present disclosure is illustrated in more detail with reference to examples and comparative examples. These examples, however, are not in any sense to be interpreted as limiting the scope of the invention.

Example 1 to Example 2 and Comparative Example 1 to Comparative Example 5

The polycarbonate resin compositions according to Examples 1 and 2 and Comparative Examples 1 to 5 are respectively prepared according to each content ratio of components shown in Table 1.

In the examples and comparative examples of Table 1, the components of the base resin are provided by wt % based on a total weight of the base resin and the cross-linked styrene-acrylonitrile copolymer and the methyl methacrylate-butyl acrylate copolymer added to the base resin are provided by a part by weight based on 100 parts by weight of the base resin, except that in the comparative examples of Table 1, the styrene-acrylonitrile copolymer (E) included in the base resin is provided by wt % based on a total weight of the base resin; and the cross-linkable polymethylmethacrylate resin (F) included in the base resin is provided by parts by weight based on 100 parts by weight of the base resin.

The components shown in Table 1 are dry-mixed in the amounts listed in Table 1, fed into a feed section of a twin-screw extruder (L/D=38, (1)=45 mm), melted/kneaded and extruded (barrel temperature: 260° C.) to prepare a thermoplastic resin composition in pellet form. The prepared pellets are dried at about 100° C. for about 2 hours, and the pellets are then injection-molded into specimens for evaluating properties and also specimens of width×length×thickness of 140 mm×200 mm×2.6 mm for evaluating appearance using a 6 oz injection molding machine at a molding temperature of about 260° C. and a mold temperature of about 60° C.

having an average particle diameter of about 250 nm and having a polybutadiene rubber amount of about 45 wt %

(A-2-2) Acrylonitrile-Butadiene-Styrene Copolymer

Acrylonitrile-butadiene-styrene copolymer (Lotte Advanced Materials Co., Ltd.) wherein an average particle diameter of a polybutadiene rubber core included in a dispersion phase is about 500 nm, an amount of the polybutadiene rubber core is about 15 wt %, and a styrene-acrylonitrile copolymer of a continuous phase has a weight average molecular weight of about 200,000 g/mol (B) Cross-Linked Styrene-Acrylonitrile Copolymer Cross-linked styrene-acrylonitrile copolymer (Chemtura) having a weight average molecular weight of about 5,000,000 g/mol (C) Methyl Methacrylate-Butyl Acrylate Copolymer Methyl methacrylate-butyl acrylate copolymer (K-125P, Dow Chemical) having a weight average molecular weight of about 2,000,000 g/mol (E) Styrene-Acrylonitrile Copolymer (SAN)

Non-cross-linked styrene-acrylonitrile copolymer (Lotte Advanced Materials Co., Ltd.) having a weight average molecular weight of about 100,000 g/mol (F) Cross-linkable Polymethylmethacrylate (PMMA) Resin Bead-shaped cross-linkable polymethylmethacrylate resin (Lotte Advanced Materials Co., Ltd.) having an average particle diameter of about 5 μm

TABLE 1

|  | Example 1 | Example 2 | Comparative Example 1 | Comparative Example 2 | Comparative Example 3 | Comparative Example 4 | Comparative Example 5 |
|---|---|---|---|---|---|---|---|
| (A-1) | 65 | 65 | 65 | 65 | 65 | 65 | 65 |
| (A-2-1) | 10 | 10 | 10 | 10 | 10 | 10 | 10 |
| (A-2-2) | 25 | 25 | 0 | 25 | 25 | 25 | 25 |
| (B) | 2 | 1 | 0 | 0 | 0 | 1 | 2 |
| (C) | 2 | 2 | 0 | 0 | 0 | 0 | 0 |
| (E) | 0 | 0 | 25 | 0 | 0 | 0 | 0 |
| (F) | 0 | 0 | 0 | 0 | 2 | 0 | 0 |

Each component shown in Table 1 is illustrated as follows.

(A) Base Resin

(A-1) Polycarbonate Resin

Polycarbonate resin (Lotte Advanced Materials Co., Ltd.) having a weight average molecular weight of about 24,000 g/mol

(A-2) Rubber Modified Vinyl-based Copolymer

(A-2-1) Acrylonitrile-Butadiene-Styrene Graft Copolymer

Acrylonitrile-Butadiene-Styrene graft copolymer (Lotte Advanced Materials Co., Ltd.) including a rubbery polymer

Property Evaluation

The prepared specimens are evaluated as to the following properties. The results are shown in Table 2 and/or the figures.

(1) Gloss (unit GU): Surface gloss is measured at a reflection angle of 60° of each of the injection molded specimens prepared as described above (injection molded at a molding temperature of about 260° C. and a mold temperature of about 60° C. in a 6 oz. injection molding machine) using a gloss meter in accordance with ASTM D523.

(2) Impact resistance (unit kgf·cm/cm): Notched Izod impact strength is measured on a ⅛"-thick notched specimen prepared as described above (injection molded at a molding temperature of about 260° C. and a mold temperature of about 60° C. in a 6 oz. injection molding machine) at room temperature in accordance with ASTM D256.

(3) Appearance: Appearance of surfaces of specimens for evaluating appearance having a width×length×thickness of 140 mm×200 mm×2.6 mm prepared as described above (injection molded at a molding temperature of about 260° C. and a mold temperature of about 60° C. in a 6 oz. injection molding machine) is evaluated with the naked eye. Specimens with excellent appearance uniformity in which flow marks are not observed on a surface of the specimen are evaluated as "good" and specimens with poor appearance uniformity in which flow marks are observed are evaluated as "inferior".

Figure 2:

FIGS. 1 and 2 show appearance evaluation references of specimens of molded articles manufactured using thermoplastic resin compositions according to embodiments. FIG. 1 is an image of a specimen having "good" appearance uniformity and FIG. 2 is an image of a specimen having "inferior" appearance uniformity. The area where the flow mark is observed in the specimens having "inferior" appearance uniformity is emphasized by the dotted line.

TABLE 2

|  | Example 1 | Example 2 | Comparative Example 1 | Comparative Example 2 | Comparative Example 3 | Comparative Example 4 | Comparative Example 5 |
|---|---|---|---|---|---|---|---|
| Gloss | 23 | 27 | 48 | 36 | 29 | 27 | 23 |
| Impact resistance | 57 | 57 | 57 | 57 | 47 | 57 | 57 |
| Appearance | Good | Good | Good | Inferior | Good | Inferior | Inferior |

From Tables 1 and 2, and FIGS. 1 and 2, thermoplastic resin compositions having low gloss characteristics and excellent impact resistance and excellent appearance and uniformity may be realized by using the polycarbonate resin, the rubber modified vinyl-based copolymer, the cross-linked styrene-acrylonitrile copolymer, and the methyl methacrylate-butyl acrylate copolymer in optimal amounts.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

The figures are schematic representations and so are not necessarily drawn to scale.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition, comprising:
about 100 parts by weight of a base resin comprising:
(A-1) about 50 to about 70 wt % of a polycarbonate resin, and
(A-2) about 30 wt % to about 50 wt % of a butadiene-based rubber modified vinyl-based copolymer,
(B) about 1 to about 3 parts by weight of a cross-linked styrene-acrylonitrile copolymer; and
(C) about 1 to about 3 parts by weight of a methyl methacrylate-butyl acrylate copolymer,
wherein the methyl methacrylate-butyl acrylate copolymer (C) has a weight average molecular weight of about 2,000,000 g/mol to about 5,000,000 g/mol.

2. The thermoplastic resin composition of claim 1, wherein the butadiene-based rubber modified vinyl-based copolymer (A-2) comprises (A-2-1) an acrylonitrile-butadiene-styrene graft copolymer comprising a butadiene-based rubbery polymer having an average particle diameter of about 200 nm to about 400 nm and (A-2-2) an acrylonitrile-butadiene-styrene copolymer comprising a butadiene-based rubbery polymer having an average particle diameter of about 400 nm to about 1,000 nm.

3. The thermoplastic resin composition of claim 2, wherein the acrylonitrile-butadiene-styrene graft copolymer (A-2-1) comprises:
a core of the butadiene-based rubbery polymer, and
a shell formed by graft-polymerization of a styrene-acrylonitrile copolymer on the core.

4. The thermoplastic resin composition of claim 3, wherein the core is included in an amount of about 40 wt % to about 50 wt % based on 100 wt % of the acrylonitrile-butadiene-styrene graft copolymer (A-2-1).

5. The thermoplastic resin composition of claim 2, wherein the acrylonitrile-butadiene-styrene copolymer (A-2-2) comprises:
a dispersion phase having a core-shell structure comprising a core of the butadiene-based rubbery polymer, and a shell formed by graft-polymerization of a styrene-acrylonitrile copolymer on the core, and
a continuous phase of a styrene-acrylonitrile copolymer.

6. The thermoplastic resin composition of claim 5, wherein the core is included in an amount of about 10 wt % to about 15 wt % based on 100 wt % of the acrylonitrile-butadiene-styrene copolymer (A-2-2).

7. The thermoplastic resin composition of claim 1, wherein the cross-linked styrene-acrylonitrile copolymer (B) has a weight average molecular weight of about 1,000,000 g/mol to about 10,000,000 g/mol.

8. The thermoplastic resin composition of claim 1, wherein the methyl methacrylate-butyl acrylate copolymer (C) is a copolymer of a monomer mixture comprising about 60 wt % to about 90 wt % of methyl methacrylate and about 10 wt % to about 40 wt % of butyl acrylate.

9. A molded article using the thermoplastic resin composition of claim 1.

* * * * *